(No Model.)

C. H. & G. GREAVES.
TIRE FOR CYCLES OR OTHER VEHICLES.

No. 605,867. Patented June 21, 1898.

Witnesses
John C. Walsh
Allan Bennett

Inventors
Chas. H. Greaves
George Greaves

UNITED STATES PATENT OFFICE.

CHARLES H. GREAVES AND GEORGE GREAVES, OF GOMERSAL, ENGLAND.

TIRE FOR CYCLES OR OTHER VEHICLES.

SPECIFICATION forming part of Letters Patent No. 605,867, dated June 21, 1898.

Application filed April 12, 1898. Serial No. 677,340. (No model.)

*To all whom it may concern:*

Be it known that we, CHARLES HENRY GREAVES and GEORGE GREAVES, subjects of the Queen of Great Britain, residing at Gomersal, near Leeds, in the county of York, England, have invented new and useful Improvements in Tires for Cycles or other Vehicles, of which the following is a specification.

The object of this invention is to construct an improved ball tire and cover for the said ball tire or for other non-collapsible tires.

We employ a series of strips of canvas which are preferably cemented to the inside central part of the metal rim and which project at each side of the wheel. These strips are further secured by means of a series of twisted bands stretched round the bed or grooves of the rim and within a canvas cover or strips, which forms a bed for the balls. Before inserting the india-rubber balls and washers there is placed around the rim a rubber cover in a highly-stretched state and preferably thicker toward the center. A series of the hollow india-rubber balls or sections and washers are inserted under this cover. The strips of canvas are then overlapped and cemented over the stretched cover. Any form of outer non-slipping cover may be employed with the tire.

Figure 1:
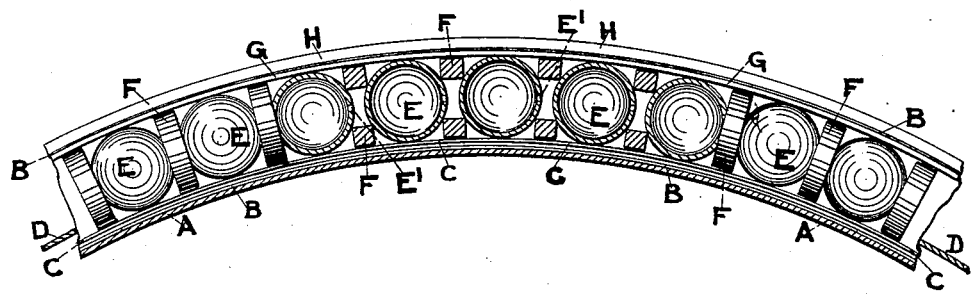
Figure 4:
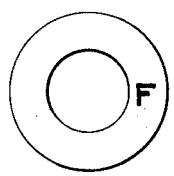
Figure 5:
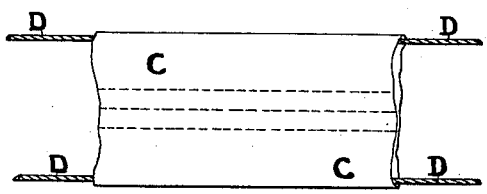
Figure 2:
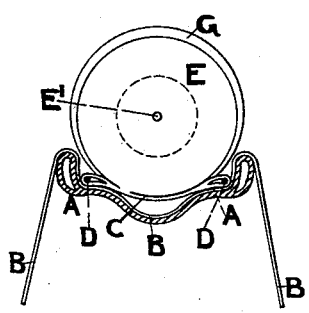
Figure 3:
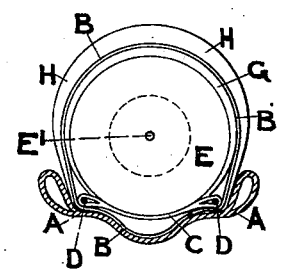

In the drawings, Figure 1 is a sectional elevation of part of tire, showing india-rubber balls and their washers in position within tire. Fig. 2 is a cross-section of improved tire and cover before canvas strips are cemented over inner cover. Fig. 3 is a cross-section of improved tire and cover complete. Figs. 4 and 5 are enlarged details.

A is the metal rim.

B is the canvas strip, cemented in lengths to the inside of the rim A.

C is the binding-strip with wires, cords, or strings D, which further secures the canvas B to the rim and forms a bed for the hollow india-rubber sections or balls E with their corresponding india-rubber washers F.

G is an india-rubber cover put on in a highly-stretched state and over which canvas strips B are cemented.

H is the outer cover, the edges of which are pushed down into the recesses of the metal rim and under the cords or band; or the balls and washers may be used with the ordinary Dunlop or other known non-slipping cover.

The balls have each an air-hole E', preferably facing into its washer, and when depressed each in turn ejects a little air, but as the weight is taken off they return to their normal shape, drawing in the air again; but they do not draw in any atmospheric air, but only the air contained within the cover, so that atmospheric changes have no effect upon them.

What we claim as the invention, and desire to secure by Letters Patent, is—

1. The combination of hollow india-rubber sections or balls E, having air-holes E', with the india-rubber rings or washers F between each ball, forming a resilient cushion or support for the covers of tires of cycles and other vehicles as shown and described.

2. The construction of tires consisting of strips of canvas B, upon the metal rim A, binding-strip C with wires or cords D, balls E and washers F, stretched cover G, and outer cover H, substantially as shown and described.

3. Outer covers for balls or sectional tires consisting of strips of canvas B upon the metal rim A, binding-strip C with cord or wire D, stretching cover G and outer cover H substantially as shown and described.

In testimony whereof we affix our signatures in presence of two witnesses.

CHAS. H. GREAVES.
GEORGE GREAVES.

Witnesses:
JOHN E. WALSH,
ALLAN BENNETT.